Nov. 23, 1948.  R. W. COBEAN  2,454,552

TEMPERATURE RESPONSIVE DEVICE

Filed April 8, 1944

Inventor:
Richard W. Cobean,
by Harry E. Dunham
His Attorney.

Patented Nov. 23, 1948

2,454,552

UNITED STATES PATENT OFFICE 2,454,552

TEMPERATURE RESPONSIVE DEVICE

Richard W. Cobean, Schenectady, N. Y., assignor to General Electric Company, a corporation of New York Application April 8, 1944, Serial No. 530,209

2 Claims. (Cl. 297—16)

My invention relates to temperature responsive devices, more particularly to thermostats for use in control devices, and has for its object a compact and reliable thermostat for control devices having a non-linear deflection response to changes in temperature.

In carrying out my invention in one form, I provide a thermostat which is edgewise wound from a bimetallic strip thermostat with the turns slightly conical, i. e., forming a frustum of a cone having an apex angle somewhat less than 180 degrees. I have found that this thermostat has two important advantages over the conventional flat wound helical thermostat; namely, the thermostat is more compact and occupies much less space for the same quantity or weight of bimetallic strip, and its response to changes in temperature is non-linear, the deflection rate increasing or decreasing as desired with an increase in temperature. The increasing deflection rate is of particular importance in the operation of electric control devices because it provides a final rapid increase in the force applied by the thermostat with consequent positive operation of the control device.

Figure 1:
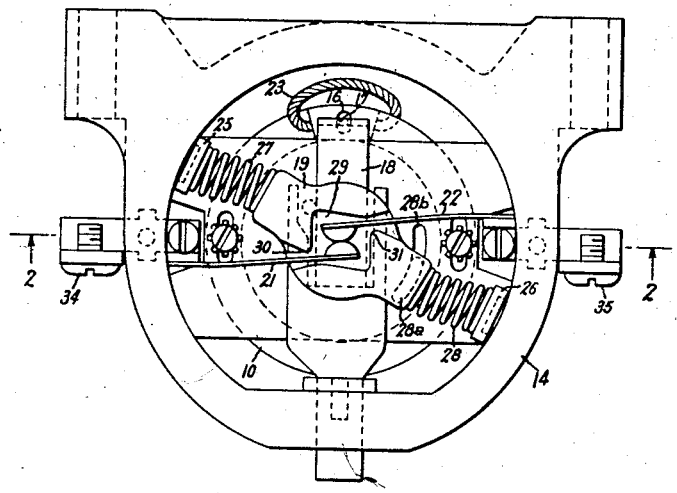
Figure 2:
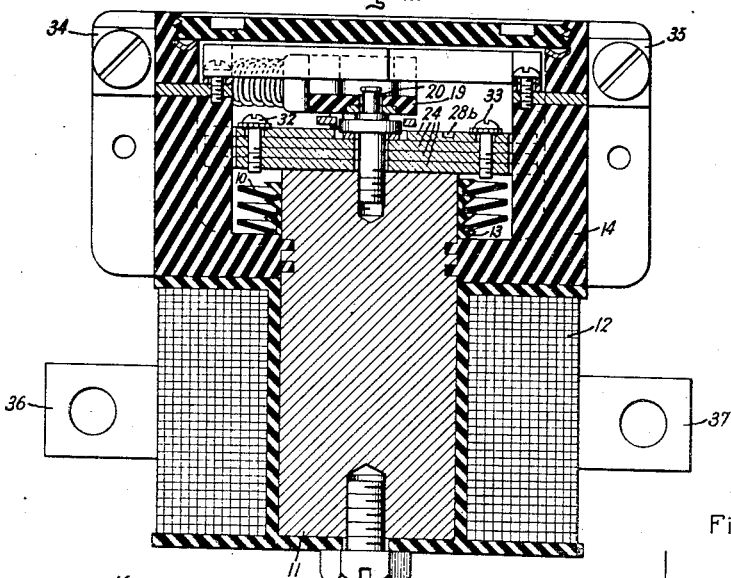
Figure 3:
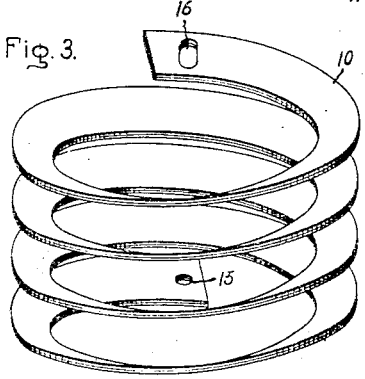
Figure 4:
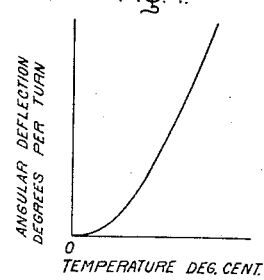

For a more complete understanding of my invention reference should be had to the accompanying drawing, Fig. 1 of which is a plan view with the cover removed of a current responsive overload protective device provided with a thermostat embodying my invention; Fig. 2 is a sectional view along the line 2—2 of Fig. 1 looking in the direction of the arrows; Fig. 3 is a view in perspective of a thermostat embodying my invention; while Fig. 4 is a typical temperature deflection curve for the thermostat.

Referring to the drawing, I have shown my invention in one form as applied to an overload protective control device of the electric inductive type, such as described and claimed in U. S. Patent 2,234,700, issued to Benjamin W. Jones on March 11, 1941.

As shown, the edgewise wound bimetallic thermostat 10 surrounds a magnet core 11 on which is also mounted a winding 12. The thermostat is directly supported in electrically insulated relation with the core 11 on an annular member 13 made of a suitable molded compound and provided with an exterior helical groove in which lie the turns of the thermostat 10. The thermostat is mechanically connected at its lower end to the supporting casing 14, made of electrically insulating material, by means of a hole 15 at its lower end through which extends a pin (not shown) secured to the casing. At its upper end the thermostat is provided with an aperture 16 elongated transversely of the thermostat through which extends loosely a projection 17 on the downturned end, as seen in Fig. 1, of a strap 18 secured to an operating member 19 made of electrically insulating material. Thus when the thermostat coils and uncoils in response to changes in temperature, the operating member 19 is turned on the pivot 20 secured to the core 11 thereby to separate or engage the cooperating contacts carried by the spring contact arms 21 and 22.

By means of a flexible electric conductor 23 having its ends electrically connected to the ends of the thermostat, the two ends of the thermostat are electrically connected with each other so that the thermostat forms a short-circuited secondary of a transformer whose primary winding is the current responsive coil 12. Thus the thermostat is heated inductively in response to the current in the coil 12. Upon an increase in temperature the thermostat coils or uncoils, depending upon the relation of the high and low thermal expansion metals forming it, with respect to the inside or outside of the frustum of a cone formed by each turn. In view of the fact that the lower end is secured to the casing, the upper end moves and turns the operating member 19 thereby to operate the contact arms 21 and 22. Thus, as shown in the drawing, when the thermostat is heated, the thermostat coils together so that its free end moves in a counterclockwise direction, as seen in Fig. 1, carrying with it the operating member 19 and separating the contacts on the ends of the contact arms.

As shown in the drawing, the thermostat of the device described was wound from a strip of bimetallic thermostatic material of uniform thickness which, it will be understood, comprises two layers integrally joined together of suitable respectively high and low thermal expansion metals. The bimetallic strip, as shown, extended outward in a direction transverse or radially with respect to its axis, i. e., crosswise of the strip at an angle with its axis greater than 45 degrees but at least a few degrees less than 90 degrees so that each turn of the helix is slightly conical, the metal of the thermostat having the higher temperature expansion coefficient being on the outer surface of the cone. In other words, as seen in the drawing, the higher expansion coefficient metal of the thermostat is on the lower side of the strip. As the temperature of the thermostat is increased, the strip twists as permitted by the pin and slot connection 15, 16 so as to lie at a decreasing apex angle and a decreasing angle with respect to the axis of the helix.

I have found that the contracting or coiling up action of the helix with an increase in temperature is not in direct proportion to the increase in temperature, as indicated for a typical thermostat by the curve Fig. 4. Thus, as the temperature increases and the turns twist and become more conical in shape, i. e., extend at a decreased angle with respect to the axis of the helix, the angle of movement of the free end of the thermostat increases for a given change in temperature. This non-linear function results from the twisting of the turns with respect to the axis of the helix. As the sides of the turns become more nearly parallel with the axis, the movement of the free end for a given change in temperature, i. e., the rate of movement, increases.

This non-linear movement of the thermostat with respect to temperature change is of advantage in the operation of electric switches in giving the switch a more positive opening or closing movement at the high operating temperature.

Referring to the other features of construction of the device disclosed, on the upper end of the magnet core 11, a plurality of magnetic plates 24 is provided, four of these plates being shown. The three lower plates are rigidly secured to the upper end of the core 11 as by screwing the pivot pin 20 into the core 11 tightly against them. The upper plate is provided with abutments 25 and 26 forming seats for helical overcenter snap springs 27 and 28 having their inner ends bearing on opposite sides of the operating member 19. With the operating member in the position shown, the springs apply forces tending to turn the operating member in a clockwise direction, as seen in Fig. 1, the operating member being held against further movement in that direction either by engagement of a projection 28a on its lower side with one end wall of a groove 28b in the upper plate, in which groove the projection moves. When the thermostat is heated, the force of the thermostat increases with increase in its temperature with little or no preliminary movement of the operating member 19 until when the required operating force is applied by the thermostat the operating member is snapped quickly by the springs 27 and 28 to its open circuit position. It will be noted that after small angular movement of the member 19 in a counterclockwise direction the springs apply a counterclockwise torque to the operating member, whereby it is snapped quickly in a counterclockwise direction to separate the switch contacts.

As shown, the operating member 19 is a molded part made of electrically insulating material having an irregular groove 29 into which extends the switch arms, the groove being enlarged at its middle to provide a space for the two contacts on the ends of the switch arms. When the operating member is turned counterclockwise, projections 30 and 31 on opposite side walls of the grooves engage respectively the switch arms 21 and 22 thereby to separate the contacts.

Calibration of the device is effected by changing the positions of the spring seats 25 and 26 with respect to the operating member 19, which is done by turning the uppermost plate 24 about the pivot 20. The upper plate is normally secured to the lowermost plates by screws 32 and 33 which extend through slots in the uppermost plate so that by loosening the screws, the plate can be turned in either direction thereby to adjust the position of the spring abutments 25 and 26 and rotational bias applied by the springs to the operating member. Terminals 34 and 35, electrically connected respectively with the switch arms, are provided by means of which the switch contacts can be included in a circuit to be controlled. Likewise terminals 36 and 37 are provided for the coil 12, whereby it may be connected in a circuit such as the circuit of an electric motor to be protected.

Although I have not shown in the drawing a complete iron magnetic circuit for the coil 12, it will be understood that an additional magnet iron member or members may be provided for completing this magnetic circuit.

It will be understood that the slope of the temperature-deflection curve of Fig. 4 is dependent upon the construction of the bimetallic thermostat, i. e., its thickness, width, diameter turns, and the metals of which it is made.

The thermostatic strip may also be wound edgewise with the high thermal expansible metal on the inside of the cone, i. e., on the upper side of the strip, as viewed in the drawing. In such case an increase in temperature produces a distortion in the strip tending to make the strip more nearly edgewise with respect to the axis of the helix, and consequently the rate of deflection of the thermostat decreases with an increase in temperature. Such a thermostat, of course, uncoils or unwinds with an increase in temperature, i. e., the movable end of a coil wound and arranged as shown in the drawing would move in a clockwise direction upon an increase in temperature.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. In a temperature responsive device, a bimetallic strip thermostat wound substantially edgewise into a helix with said strip extending radially at an angle with the axis of said helix of greater than 45 degrees but at least a few degrees less than 90 degrees so that said strip twists in response to changes in temperature and thereby coils and uncoils in accordance with a non-linear function of such changes in temperature.

2. In a temperature responsive device, a bimetallic strip thermostat wound substantially edgewise into a helix from a bimetallic strip of uniform thickness with said strip extending radially at an angle with the axis of said helix of greater than 45 degrees but at least a few degrees less than 90 degrees so that said strip twists in response to changes in temperature and thereby coils and uncoils in accordance with a non-linear function of such changes in temperature.

RICHARD W. COBEAN.

REFERENCES CITED

The following references are of record in the file of this patent:

UNITED STATES PATENTS

| Number | Name | Date |
| --- | --- | --- |
| 1,671,491 | Scott | May 29, 1928 |
| 2,120,582 | Sonkin | June 14, 1938 |
| 2,214,645 | Townsend | Sept. 10, 1940 |
| 2,234,700 | Jones | Mar. 11, 1941 |
| 2,279,236 | Hoopes | Apr. 7, 1942 |
| 2,317,018 | Alban | Apr. 20, 1943 |